Jan. 6, 1953   J. E. SAYRE   2,624,142
ADVERTISING DISPLAY DEVICE
Filed June 7, 1949   2 SHEETS—SHEET 1
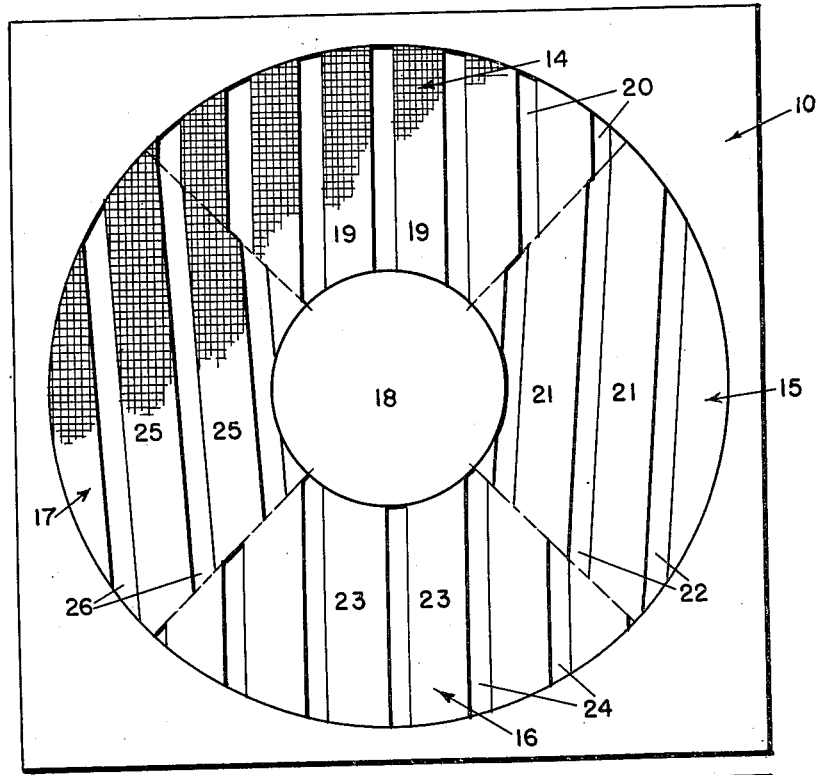
FIG. 2.
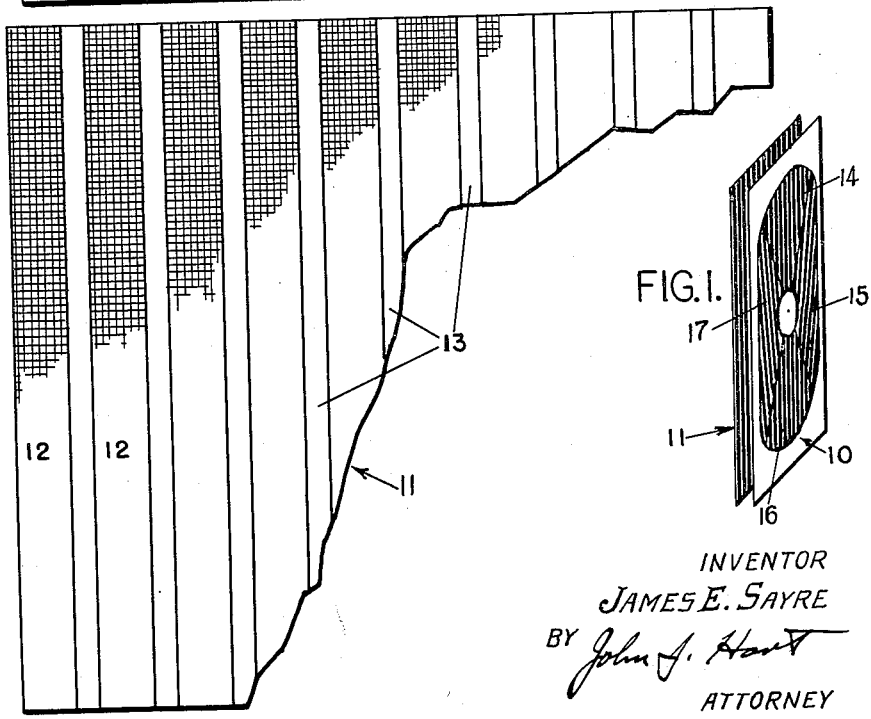
FIG. 3.
FIG. 1.
INVENTOR
JAMES E. SAYRE
BY John J. Hart
ATTORNEY

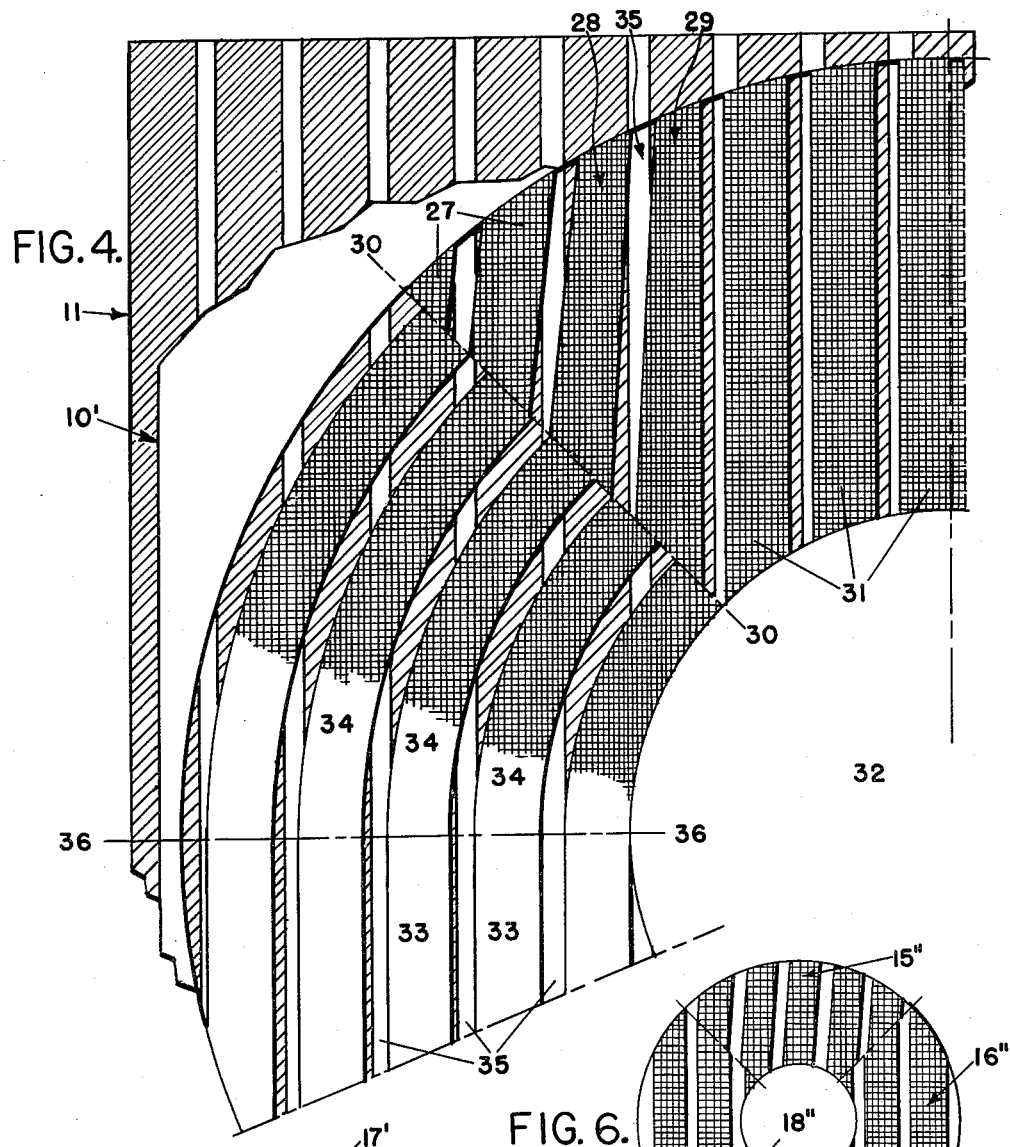

Patented Jan. 6, 1953

2,624,142

UNITED STATES PATENT OFFICE 2,624,142

ADVERTISING DISPLAY DEVICE

James E. Sayre, Little Neck, N. Y.

Application June 7, 1949, Serial No. 97,659

4 Claims. (Cl. 40—137)

This invention relates to advertising devices used for the purpose of attracting the attention of persons to a sign or other advertising material displayed in association therewith.

An object of the invention is to provide an improved advertising device which is so unique and attractive in its appearance that it will compel the attention of all persons within whose fields of vision it may happen to be.

Another object of the invention is to provide an advertising device which will have a low initial cost and whose operation will involve no, or relatively little expense.

A further object of the invention is to provide an advertising device which will be relatively simple in construction and which can be made in accurate and operable form in large quantities at relatively low cost.

Other objects as well as the advantages of the invention will become apparent after a perusal of the following description, when read in connection with the accompanying drawings in which Fig. 1 is a perspective view illustrating the construction and arrangement of the front and rear parts of an advertising device made in accordance with the invention; Fig. 2 is a plan view of the operable portion of the front part of the device shown in Fig. 1; Fig. 3 is a plan view of a portion of the rear part of such device; Fig. 4 is a plan view of a portion of the operable parts of a modified form of the invention; Fig. 5 is a plan view of the front part of another embodiment of the invention, and Fig. 6 is a view similar to Fig. 5 showing still another form of the invention.

The advertising device of this invention is essentially composed of two grids which are arranged in substantially parallel spaced relation and constructed to create an illusion that something is moving when, in fact, no part of the device actually moves; the motion of the observer relative to the device being relied upon to produce such optical illusion. I have found that when the two grids are properly constructed, I am enabled to cause and combine four distinct directions or fields of motion in one area. These fields of motion may be arranged to simulate the illusion of a circular motion such as for example, a turning wheel, or to simulate a sunburst effect in which the directional movements radiate outwardly from the center of the device, or to simulate a high lighting effect in which the movements contract in diminishing circles to bring the observer's attention to the center of the device.

In Figs. 2 and 3 of the drawings, there is illustrated a construction of the device whereby the rotary effect is accomplished. As is shown in Fig. 1 of the drawings, the device essentially comprises a front grid 10 and a rear grid 11, the former of which is arranged in substantially parallel, spaced relation in front of rear grid 11, so that as an observer passes by the device, he will see the front grid only. The spacing of the front and rear grids will be dependent upon the anticipated distance and/or speed at which the observer is expected to pass the device and the angle at which the device may be positioned relative to the path of travel of the observer. The back or rear grid is composed of a series of dark and light strips 12 and 13 respectively, arranged vertically in side-by-side alternate relation. This construction may be attained by the use of vertically disposed, parallelly arranged, spaced slots or by painting or printing dark strips on a light colored background or on a transparent material such as glass, cellophane, or a film made of vinyl resin, etc. Accordingly, where in the claims the term "light strips" is used, this term shall be understood to include slots or openings. The two grids might even be painted on the opposite sides of a single thick sheet of some material such as glass, Plexiglas or Lucite, either lighted or unlighted. With regard to the rear grid, the dark strips 12 are substantially wider than the light strips 13 and I have found that in order to obtain good effects or motion, the proportion of dark to light area is important. In the attached drawings, I have used a proportion of eight for the dark strips 12, and three for the light strips 13. For example, in the rear grid depicted in Fig. 3 of the drawings, the black or dark strips 12 are 8/16 of an inch wide and the light strips 13 are 3/16 of an inch wide, so that thirteen strips of both black and light take up eleven inches.

The front grid 10 which substantially conceals the rear grid 11 and which controls the particular optical illusion which it is desired to be produced, is divided into four fields or quadrants 14, 15, 16 and 17 spaced around a central portion 18 on which is provided the advertising matter to which the observer's attention is to be directed. Each quadrant in the drawings is projected on an angle of 90°. In actual practice I might care to vary this to some extent, for instance, by projecting the top and bottom quadrants on a 60° angle, probably centered. This would enlarge the side quadrants to 120° each. It will be understood that while 18 is shown as circular in form, it may have any configuration suitable to the purposes of the advertisement. As is shown more clearly in Fig. 2 of the drawings, each of the quadrants of the front grid 10 is composed of a plurality of strips which are disposed in vertical spaced relation to provide a plurality of slits through which passes either direct or reflected light from the light strips 13 of the rear grid depending upon the construction of the latter. The strips in each quadrant are dark in color and may be constructed in any suitable manner as by the use of opaque slats, cutting out slits in opaque material, or by painting or printing on a transparent medium. Field 14 of the front grid 10 is composed of vertical strips 19 and slits or spaces 20, which are disposed in parallel relation to the dark and light strips 12 and 13, respectively, of the rear grid 11. The dark strips 19 in field 14 are slightly narrower in width (about $\frac{1}{16}$" wide) than the width of the dark strips 12 on the rear grid, while the width of the slits or spaces 20 between such dark strips is the same as the light strips 13 of the rear grid, namely, $\frac{3}{16}$ of an inch. This arrangement of the strips on field 14 and the strips on the rear grid will produce a simulated motion in the display moving in a direction opposite to that of the direction of movement of the observer. Thus, if the observer is moving from left to right in front of the device, as viewed in Fig. 2 of the drawings, he will obtain the effect of motion in a right to left direction. This is due to the changes in the relative positions of the light and dark areas of the device, as the observer moves relative thereto or in other words, to the progressive cutting off and exposure of the light and dark strips of the rear grid by the strips of the front -grid during the observer's progress. As such cutting off and exposure of the light and dark strips in the rear grid take place in a horizontal direction, namely, the widths of such strips, the parallel, vertical areas of varying widths which are exposed to the observer during his movements will give him the illusion that they are moving in a direction opposite to that in which he is traveling.

The field designated 15 in Fig. 2 of the drawings is composed of a plurality of dark strips 21 which are parallelly arranged in spaced relation to produce the parallel slits 22 therebetween, but instead of being arranged in parallel relation to the dark strips 12 of the rear grid, are inclined to the right at an angle of approximately 4 degrees from the vertical. The strips 21 and slits 22 of this field have the same widths as the strips 12 and 13, respectively, of the rear grid, namely $\frac{3}{16}$ inch and $\frac{1}{16}$ inch, respectively. This arrangement in combination with the strips of the rear grid 11, gives to an observer who is passing horizontally in front of the device, the effect of streaks of light rising, or of motion in an upward direction.

The strips 23 and slits 24 of field 16, like the strips and slits of field 14 are arranged parallelly to the dark and light strips of the rear grid 11. The width of the slits 24 of field 16 is the same as the width of the slits 20 of field 14 and the light strips 13 of the rear grid, namely, $\frac{1}{16}$ inch, but the width of the dark strips 23 is greater than the dark strips 19 of field 14 and the dark strips 12 of the rear grid, being $\frac{1}{2}$ of an inch instead of $\frac{3}{16}$ inch. The simulated motion produced by this construction will go in the same direction as the observer.

In the last quadrant 17, the width of the parallelly arranged strips 25 and slits 26 are the same as the widths of the strips 21 and slits 22, respectively, of field 15, but instead of being inclined to the right as are the latter, such strips 25 and slits 26 are inclined to the left at an angle of approximately 4° from the vertical. This construction will give to an observer traveling as aforesaid the effect of motion in a downward direction.

It will be understood from the foregoing, that when an observer walks by the above described display device, from left to right as viewed in Fig. 2 of the drawings, the construction of the several quadrants 14, 15, 16 and 17 of the front grid 10 is such that he will obtain the illusion that motion or movement is occurring in directions from right to left in quadrant 14, downwardly in quadrant 17, from left to right in quadrant 16 and upwardly in quadrant 15. Thus, although the observer moves in only one direction, the four quadrants give the effect of four separate and distinct movements, each one traveling in a different direction but in a counterclockwise manner. The arrangement of the quadrants is such that these four movements will give the impression of conforming to a circular pattern. The combined visual effect produced by all of the quadrants therefore, will be rotary so that the observer will have the impression that he is looking at a spinning or turning wheel. This turning illusion will in turn, direct the observer's attention to the advertising matter on the central portion 18.

By maintaining the same essential construction of fields or quadrants 14, 15, 16 and 17, but arranging them differently relative to each other in the device, the four distinct movements produced by such quadrants can be made to produce entirely different visual effects. For example, if such quadrants are arranged in the order or manner indicated by the quadrants 14', 15', 16' and 17' in Fig. 5 of the drawings, a highlighting effect will be obtained. Thus, an observer walking from left to right past a device whose front grid is constructed in the manner shown in Fig. 5 of the drawings, and whose rear grid is constructed in the manner previously explained, will obtain from field 14' in a manner similar to field 14, an effect of movement to the left, from field 15' in a manner similar to field 15, an effect of movement upwardly, from field 16' in a manner similar to field 16, an effect of movement in the same direction in which he is moving, and from field 17' in a manner similar to field 17, an effect of movement downwardly. The combined visual effect of the movements of fields 14', 15', 16' and 17' to the observer will be therefore concentric waves or circles of movement proceeding from the circumference of the front display grid towards the advertising material at the hub 18' of such concentric waves. The observer's attention therefore, will readily be directed to such advertising matter. In this arrangement and construction of the several fields, it is preferred that the inclination of the strips in fields 15' and 17' could be inclined at varying angles in relation to the vertical strips of the back grid. This would be governed by the desired effect, the distance between the two grids, the anticipated distance of the observers, and the degree of incline. The less the angle, the greater speed of the effect or motion. The greater the angle, the slower the motion.

Similarly by arranging the four fields of movement 14, 15, 16 and 17 in the order indicated by the quadrants 14", 15", 16" and 17" in Fig. 6 of the drawings, instead of such movements combining to give the impression of concentric waves of movement towards the hub of the device as in the construction of Fig. 5, such movements will appear to radiate outwardly from the hub 18" towards the circumference of the grid to produce a sunburst effect.

The visual effects produced by the four fields in the embodiments previously described may be heightened by employing in each of the fields a combination of two or more of the features of all four fields. This is illustrated in Fig. 4 of the drawings, which shows a portion of a front grid and part of the underlying rear grid constructed to produce the rotary effect heretofore described in connection with Figs. 1 to 3, but in an improved manner. The front grid 10' depicted in Fig. 4 is also designed to produce the rotary effect in a direction opposite to that produced by the front grid shown in Fig. 2 or in a clockwise direction. Referring now to Fig. 4 of the drawings, the top quadrant or field which is comparable to half of field 14 in Fig. 2 is designed to give the illusion of motion to the right, as viewed in this figure, as the observer moves to the right in passing by the device. This quadrant therefore will have essentially the construction of previously described quadrant 16. However, in order to bend the direction of movement more nearly towards a true circular movement, the dark strips 27, 27 and edge of strip 28 adjacent to strips 27, 27, are inclined to the right, as viewed in Fig. 4, at an angle of approximately six degrees from the vertical, while the opposed edges of strip 28 and strip 29 are inclined to the right at an angle of approximately three degrees. It will be understood that as a result of this arrangement, the four strips 27, 27, 28 and 29 which in this quadrant extend from the dividing line 30—30 thereof to the periphery of the grid, will give an illusion of movement which is a combination of the movements created by previously described fields 15 and 16. Thus, strips 27, 27 and the adjacent edge of strip 28 together with the associated openings or slits will, like field 15, give the effect of a rising movement and at the same time, advance such movement to the right as in the case of field 16. This will also be true of the opening or slit defined by the strips 28, 29 but to a less marked extent in a rising direction and to a greater extent in a horizontal direction due to the reduced inclination of the slit defined by such edges. The strips 31 extending from the hub 32 which are constructed and arranged in a manner similar to related strips in field 16 will give an illusion of movement to the right as the observer walks in that direction. It will thus be seen that when the field is so constructed, the created movement will bend from the vertical to the horizontal and thus give a more realistic impression of circular motion. To complete this illusion, the strips on the right-hand side of this quadrant will be similarly constructed but in a reverse fashion so that there is attained an illusion comparable to that produced by a combination of fields 16 and 17 in which the motion is bent in a clockwise fashion back to the vertical. The bottom field in a grid of the type shown in Fig. 4 and comparable to field 16 in Fig. 2 will be constructed in a similar fashion but the slats thereof which extend from the hub 30 to the periphery of the grid would be constructed in a manner similar to those of field 14, while the shortened strips at the right-hand side of such field would combine the features of fields 16 and 17 and the shortened strips at the left-hand side of such field would combine the structural features of fields 14 and 15 to bend the movement in an arcuate, clockwise manner through such field.

The fields of the front grid shown in Fig. 4 which bear a relation to fields 15 and 17 in Fig. 2, are constructed in the following fashion: Fig. 4 shows only a quadrant which compares with field 17 of Fig. 2, but it will be understood that the opposite field or quadrant is constructed in a similar fashion but in a reverse manner. In this quadrant, the strips 33 thereof, below the horizontal line 36—36, which extends through the center of the grid, are constructed and arranged in a similar fashion to the strips of field 15, that is, they are inclined to the right, but at an angle of only two degrees from the vertical, thus slowing the rising effect produced thereby. Above the horizontal line 36—36, the strips 33 are progressively inclined to the right from the vertical and towards the dividing line 30—30 of the upper quadrant so that intermediate such lines the strips 33 have an arcuate form. These upper arcuate portions 34 of the strips 33 are arranged in concentric fashion with respect to the hub 32 and the periphery of the grid and from arcuately-shaped slits 35 therebetween which are equal in width throughout their lengths. It will thus be seen that below the horizontal line 36—36, the strips 33 will give an illusion of rising motion similar to that produced by field 15 but at a faster rate due to the decreased pitch of the slats 33. The upper arcuate portions 34 of such strips and the openings 35 therebetween, will create a similar illusion but tend to bend such motion toward a circular pattern. It will be noted that line 30—30 intersects the hub 32 at a 45 degree angle from vertical. In some cases, I might choose to decrease this angle to 15° or possibly even closer to the vertical; this would extend the arcuate length of strips 34 into the quadrant above and to the right, and would be an alternate form for strips 27, 28 and possibly 29. The quadrant opposite to this quadrant and comparable to field 15 in Fig. 2, will be constructed in a similar fashion except that the straight portions of the strips which will be located above the horizontal line 36—36 through the center of the grid, are constructed similarly to the slats of field 17 but at a reduced angle or two degrees from the horizontal and the curved portions of such strips will extend downwardly in an arcuate fashion towards an extension of line 30—30 dividing such quadrant from the bottom quadrant of the grid.

It will thus be seen that the combination of the four movements created by the construction of a front grid such as shown in Fig. 4, will bend the movements created more toward a circular path so that a more realistic impression of a turning wheel is obtained. These features can also be utilized in the construction of grids such as shown in Figs. 5 and 6 to obtain truly circular concentric waves of movement in the sunburst and highlighting effects created by such constructions.

While I have hereinabove described and illustrated in the drawings, preferred embodiment of the invention, it will be apparent to those skilled in the art that modifications and changes may be made therein to obtain different effects without departing from the teachings of the invention. For example, while I have described the invention in relation to a moving observer, it is apparent that the same visual effects can be produced for a stationary observer or one who may walk directly towards the device due to the position of the latter, by causing rotation of one or both of the grids relative to each other. Hence, it is contemplated that the invention shall include any such changes and modifications which come within the legitimate scope of the appended claims.

I claim:

1. An advertising device comprising a pair of grids arranged in spaced relation one behind the other, the rear grid having substantially vertically disposed dark and light strips arranged in alternate fashion, the front grid being composed of a central portion concealing the central portion of said rear grid and a plurality of sections arranged around said central portion to form as a whole an annular-like area, said annularly disposed sections being composed of a plurality of dark strips extending substantially vertically and arranged in spaced relation to permit the passage of light therebetween, the strips of at least two sections positioned on opposite sides of said central portion being in major part substantially parallel to the rear grid strips, the strips in one of said opposed sections being wider than the dark strips on said rear grid and the strips in the other of said opposed sections being narrower than the dark strips on said rear grid, and the strips of at least two other sections positioned on opposite sides of said central portion being in part at least inclined with relation to the rear grid strips and in opposite directions from the vertical, the strips in adjacent of said sections being so arranged that in cooperation with said rear grid said sections produce as a whole to a passing observer the illusion of circular movement concentric to the center of the annular-like area formed by said sections.

2. An advertising device comprising a pair of grids arranged in spaced relation one behind the other, the rear grid having substantially vertically disposed dark and light strips arranged in alternate fashion, the front grid being composed of a central portion concealing the central portion of said rear grid and an annularly-shaped portion surrounding said central portion and composed of four sections whose lines of juncture are radially disposed, said sections being composed of a plurality of dark strips extending substantially vertically and arranged in spaced relation to permit the passage of light therebetween, the strips in two sections positioned on opposite sides of said central portion being in major part substantially parallel to the rear grid strips, the strips on one of said opposed sections being wider than the dark strips on said rear grid and the strips in the other of said opposed sections being narrower than the dark strips on said rear grid, and the strips in two other sections positioned on opposite sides of said central portion being in part at least inclined with relation to the rear grid strips and in opposite directions from the vertical, the strips in adjacent of said sections being so arranged that in cooperation with said rear grid said sections produce as a whole to a passing observer the illusion of circular movement concentric to the center of the radially disposed lines of juncture.

3. An advertising device such as claimed in claim 1 in which the strips of said two other opposed sections in said front grid have straight portions and curved portions, the curved portions of the strips in each of such sections terminating at the line of juncture of such section with an adjacent section.

4. An advertising device such as claimed in claim 1 in which the strips of said two other opposed sections in said front grid have straight portions and curved portions, the straight portions of the strips in each of such sections starting at the line of juncture of such section with an adjacent section and the curved portions of the strips in such section terminating at the line of juncture of such section with another adjacent section having inclined strips adjoining such curved portions.

JAMES E. SAYRE.

REFERENCES CITED

The following references are of record in the file of this patent:

UNITED STATES PATENTS

| Number | Name | Date |
|---|---|---|
| 771,824 | Ives | Oct. 11, 1904 |
| 956,857 | Jennings | May 3, 1910 |
| 957,119 | Spiegel | May 3, 1910 |
| 1,006,769 | Merrill | Oct. 24, 1911 |
| 1,278,094 | Becker | Sept. 10, 1918 |
| 1,430,314 | Morley | Sept. 26, 1922 |
| 2,061,309 | King | Nov. 17, 1936 |
| 2,482,947 | Swarbrick | Sept. 27, 1949 |